(12) United States Patent
Mueller (10) Patent No.: US 7,946,632 B1
(45) Date of Patent: May 24, 2011

(54) APPARATUS FOR ATTACHING ACCESSORIES TO A MOTORCYCLE

(76) Inventor: Allen B. Mueller, Collierville, TN (US)

( * ) Notice: Subject to any disclaimer, the term of this patent is extended or adjusted under 35 U.S.C. 154(b) by 592 days.

(21) Appl. No.: 12/034,473

(22) Filed: Feb. 20, 2008

Related U.S. Application Data (60) Provisional application No. 60/890,783, filed on Feb. 20, 2007.

(51) Int. Cl.
*E05C 19/00* (2006.01)
*E05C 5/00* (2006.01)

(52) U.S. Cl. .......... 292/1; 292/57; 292/60; 292/63; 292/163; 292/DIG. 37; 292/DIG. 63; 280/288.4

(58) Field of Classification Search .......... 292/1, 57, 292/60, 63, 64, 67, 163, 164, 175, 194, 207, 292/216, 288, DIG. 37, DIG. 63; 411/525; 280/288.4
See application file for complete search history.

(56) References Cited

U.S. PATENT DOCUMENTS

| | | | |
|---|---|---|---|
| 875,019 A | 12/1907 | Wahlert | |
| 1,769,895 A | 7/1930 | Bersted | |
| 2,069,163 A | 1/1937 | Hibner | |
| 2,295,021 A * | 9/1942 | Weiss | 280/506 |
| 2,381,633 A * | 8/1945 | Weare | 292/341.17 |
| 3,132,402 A | 5/1964 | Joseph | |
| 3,406,995 A * | 10/1968 | McCarthy | 292/169.15 |
| 4,082,345 A | 4/1978 | Willey | |
| 4,226,463 A | 10/1980 | Gager, Jr. | |
| 4,277,866 A * | 7/1981 | Song | 24/600.6 |
| 4,373,235 A | 2/1983 | Korgaonkar | |
| 4,489,973 A | 12/1984 | Willey | |
| 5,060,992 A * | 10/1991 | Anderson | 292/207 |
| 5,413,392 A * | 5/1995 | Schlack et al. | 292/204 |
| 5,497,973 A | 3/1996 | Balzen et al. | |
| 5,658,035 A | 8/1997 | Armstrong | |
| 5,664,715 A * | 9/1997 | Gogan et al. | 224/413 |
| 5,667,232 A * | 9/1997 | Gogan et al. | 280/202 |
| 5,732,965 A | 3/1998 | Willey | |
| 5,988,727 A | 11/1999 | Mueller | |
| 6,358,020 B1 * | 3/2002 | Staton et al. | 417/410.3 |
| 6,443,344 B1 * | 9/2002 | Nicosia et al. | 224/413 |
| 6,484,914 B1 * | 11/2002 | Willey | 224/413 |
| 6,662,409 B2 * | 12/2003 | Benecke | 24/369 |
| 6,729,515 B2 * | 5/2004 | Nicosia et al. | 224/413 |
| 6,974,175 B2 * | 12/2005 | Willey | 296/78.1 |
| 7,150,382 B2 * | 12/2006 | Zickefoose | 224/423 |
| 7,654,496 B2 * | 2/2010 | Sharpe et al. | 248/222.11 |
| 2003/0227178 A1 * | 12/2003 | Hofhauser | 292/216 |

\* cited by examiner

*Primary Examiner* — Carlos Lugo
(74) *Attorney, Agent, or Firm* — Wyatt, Tarrant & Combs, LLP; Matthew A. Williams (57) ABSTRACT

A mounting system for accessories, including motorcycle windshields and windscreens, that quickly and securely attaches the accessory in such a manner that that the accessory will not come unexpectedly detached. After the initial installation of the components of the mounting system, the installation of an accessory requires a minimum of force and the installation and removal of an accessory is accomplished without the use of tools.

12 Claims, 12 Drawing Sheets

APPARATUS FOR ATTACHING ACCESSORIES TO A MOTORCYCLE

CROSS-REFERENCE TO RELATED APPLICATIONS

This application claims the benefit of U.S. Provisional Application No. 60/890,783, filed Feb. 20, 2007.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention generally relates to motorcycles and more specifically to an apparatus for allowing an accessory to be quickly, easily, and securely attached to a motorcycle in a secure manner and allowing the accessory to be quickly and easily detached from the motorcycle.

2. General Background of the Invention

In the United States, today's motorcycle industry is fueled and driven by enthusiasts who consider riding motorcycles a sport and accessorizing and personalizing them as an avocation. The motorcycle accessory aftermarket is a multibillion-dollar industry. But since motorcycles vary widely in their configuration, servicing the market demands stocking a large number of similar accessories adapted to fit specific models of motorcycles. To reduce the complexity of stocking inventory to fit all types of motorcycles, what is needed is an easy means for securely attaching a standard accessory to a large number of different motorcycle models.

In addition, many motorcycle enthusiasts only desire to have the accessory attached to their motorcycle for specific activities and do not want the accessory attached to their motorcycle for other activities. For example, many motorcycle enthusiasts desire to have a windscreen or windshield (hereinafter referred to only as "windshield") when they are going to be taking a long ride at highway speeds in order to minimize fatigue resulting from the force of the wind and to reduce the probability of being injured by debris thrown into the air by other vehicles. Yet many of these same enthusiasts do not want a windshield when taking short trips or traveling at lower speeds because they desire to experience the wind in their face. Another example is the use of saddlebags. Many enthusiasts may want to use saddlebags when they are taking a long trip or traveling to the store to purchase items that they will have to carry home on their motorcycles, but they may not want to be burdened with the saddlebags when they are merely going out for a leisurely ride. Thus, what is needed is a means for securely attaching a standard accessory that allows the accessory to be easily removable from the motorcycle without the use of tools. And since enthusiasts will often operate their motorcycles with the accessories detached, any portion of the apparatus used to attach the accessories must be sleek and unobtrusive so as to not distract from the aesthetics of the motorcycle itself when the accessory is not attached to the motorcycle.

In addition to variations between motorcycle models, there is often a wide variation in the configurations of the different types a specific class of accessory that are available. For example, since most motorcycles are sold without windshields, a large variety of windshield styles are available to allow the owner of a motorcycle to accessorize the motorcycle with a windshield that appeals to the owner's sense of aesthetics. It goes without saying that a motor cycle owner will be much more likely to purchase a windshield, or even multiple windshields, if it can be easily and securely attached to the motorcycle and quickly and easily removed from the motorcycle. The same is true for other types of accessories as well.

Another factor that must be taken into account is the safety of the accessory when it is attached to the motorcycle. For example, a windshield must resist a great deal of force when the motorcycle is moving along a highway at speeds of 70 m.p.h or more. Any system of attaching the windshield must be able to resist this force. In addition to the wind force, the mounting system must also be able to resist other forces that the motorcycle is a subject to such as the force of impacts incurred by the motorcycles wheels as they encounter irregular road surfaces that is transferred through the motorcycle's suspension to the remainder of the motorcycle, including attached accessories such as a windshield. And yet another force that can be incurred on a windshield specifically is a large wind force from the side of the windshield or even from the rider's side of the windshield resulting from a large truck or similar vehicle passing by the motorcycle at a high speed.

Despite the known existence of these forces, existing, detachable mounting devices are known to fail, allowing windshields and other accessories to become suddenly, and unexpectedly detached from the motorcycle. One example is the device disclosed in now-expired U.S. Pat. No. 5,658,035 for a Quick Detachable Motorcycle Windshield, which is incorporated herein by reference. The motorcycle windshield disclosed in this patent utilizes a flimsy wire to retain the windshield in place, which is known to allow the windshield to detach from a motorcycle unexpectedly. In contrast, the present invention includes a latching mechanism that is biased to a latched position and positively locks into place eliminating the potential for the windshield or other accessory to unexpectedly detach from the motorcycle.

While the background for the present invention has been described in terms of its applicability to motorcycle accessories such as windshields and saddlebags, it should be obvious to one of skill in this art that this invention is equally applicable to other types of vehicles, boats, and airplanes as well as anywhere else a quick and secure means of attaching one thing to another that is also easily detachable without the use of tools is required.

SUMMARY OF THE INVENTION

The present invention is an apparatus that allows a windshield or other accessory to a motorcycle to be installed and removed from the motorcycle without the use of tools once the components of the apparatus have been initially attached to the motorcycle and the accessory. The apparatus comprises a first docking member projecting from said object; a second docking member projecting from said object; a mounting plate connected to said accessory, said mounting plate defining a first slot and a second slot wherein the first slot is sized to slide onto the first docking member and the second slot is sized to slide onto the second docking member and located such that it engages said second docking member as the mounting plate is rotated about the first docking member; and a latch mechanism, said latch mechanism being pivotally attached to said mounting plate whereby said latch mechanism can be rotated from an open position wherein it does not occlude the opening of the second slot to a closed, latched position wherein the latch mechanism at least partially occludes the opening of the second slot and engages the bracket to latch. Alternatively, the docking members could be connected to the accessory and the mounting plate with the slots and the latching mechanism connected to the motorcycle.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
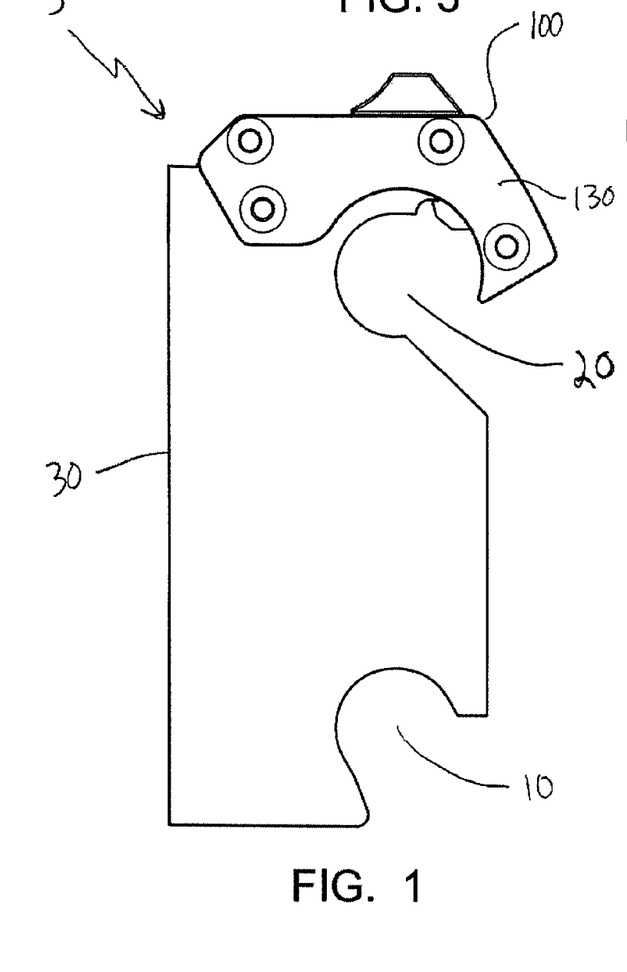
FIG. 1—Front view of the accessory portion of the invention with the latch mechanism in its closed position.
Figure 2:
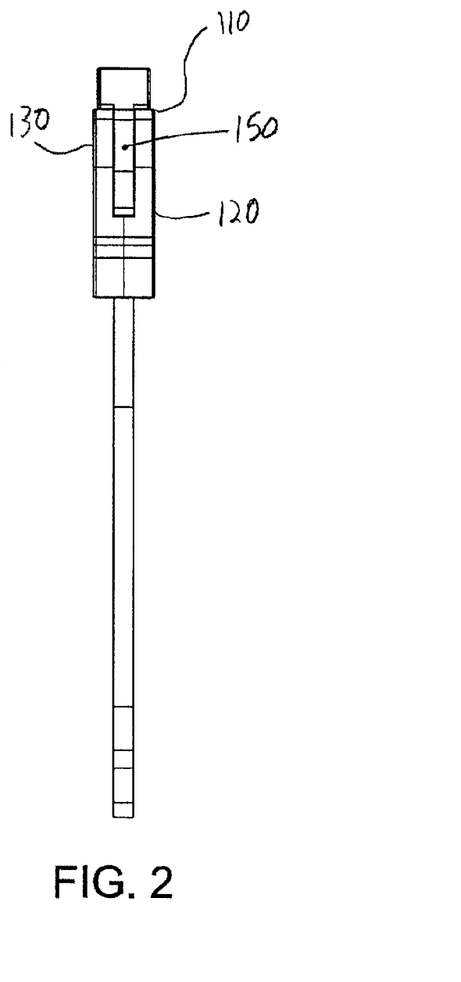
FIG. 2—Side view of the accessory portion of the invention with the latch mechanism in its closed position.
Figure 3:
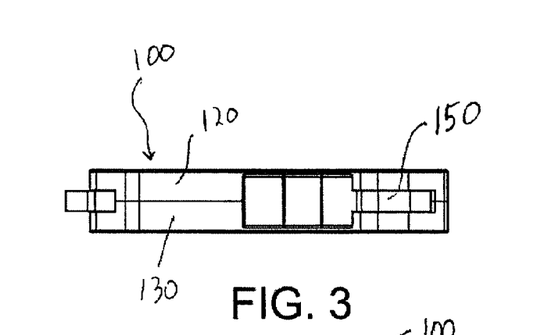
FIG. 3—Top view of the accessory portion of the invention with the latch mechanism in its closed position.
Figure 4:
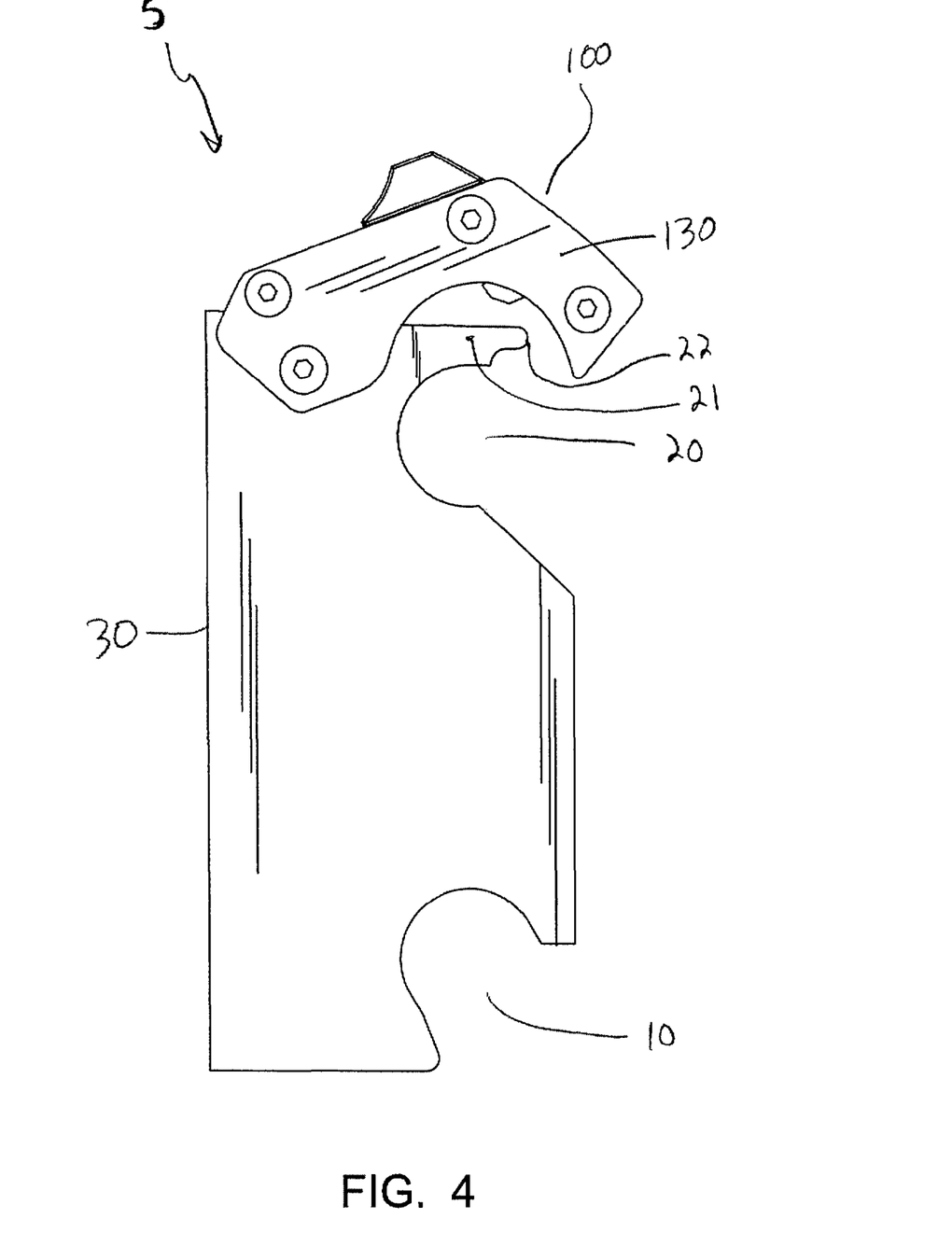
FIG. 4—Front view of the accessory portion of the invention with the latch mechanism in its open position.

Referring to FIGS. 1-5, accessory portion 5 of the invention can be seen. This portion of the invention includes mounting plate 30 that defines slots 10 and 20 and latch mechanism 100 of the invention. Slots 10 and 20 are sized to engage docking members 40 and 50 respectively (docking members 40 and 50 can be seen in FIGS. 6-8). Mounting plate 30 may take on a variety of configurations and sizes, and it may even be incorporated as an integral part of the accessory being mounted. In FIG. 4, latch mechanism 100 is illustrated in its open position; in this position, latch mechanism 100 does not occlude the opening of slot 20. FIG. 1, on the other hand, illustrates latch mechanism 100 in its closed position in which latch mechanism 100 at least partially occludes the opening of slot 20. It should be noted that latch mechanism 100 includes housing 110, which is formed by first housing portion 120 and second housing portion 130, and sliding member 150.

Figure 5:
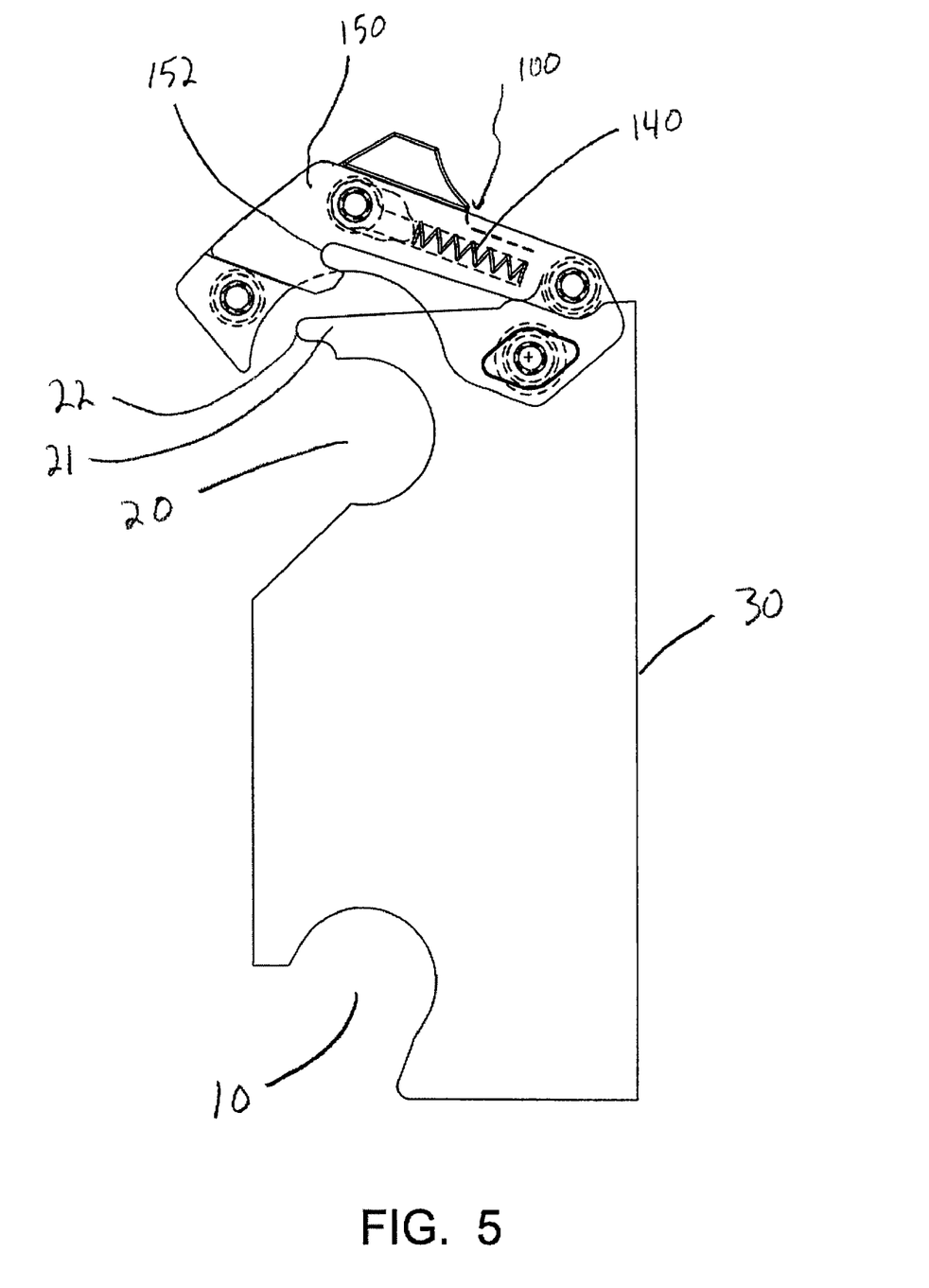
FIG. 5—Rear view of the accessory portion of the invention showing a portion of the internal structure as hidden features.

FIG. 5 is a rear view of accessory portion 5. In this figure, latch mechanism 100 is in the open position illustrated in FIG. 4. The hidden lines in FIG. 5 illustrate the manner in which hook portion 152 of latching member 150 engages finger 22 that defines upper portion 21 of slot 20 to secure latch mechanism 100 into place.

Figure 6:
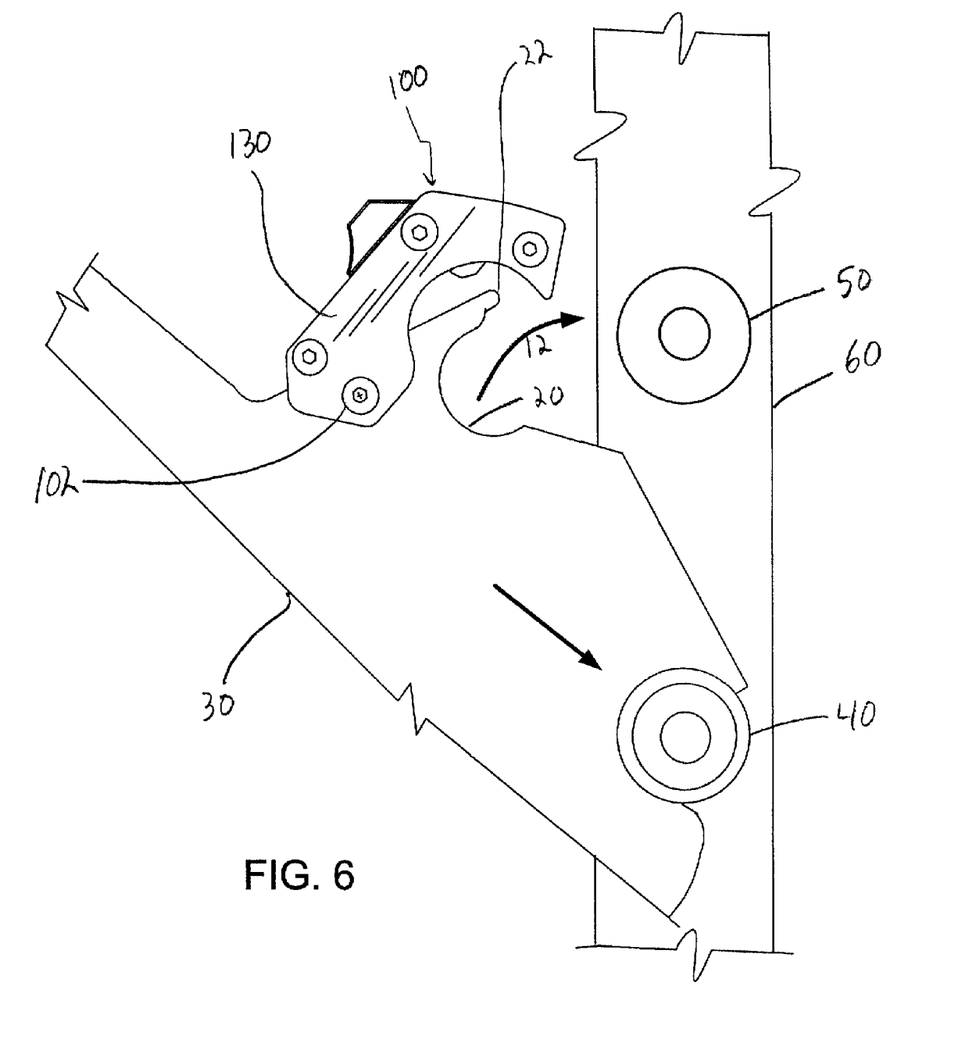
FIG. 6—Front view showing lower slot of the accessory portion of the invention engaged with the lower docking member and the latch mechanism in its open position.
Figure 7:
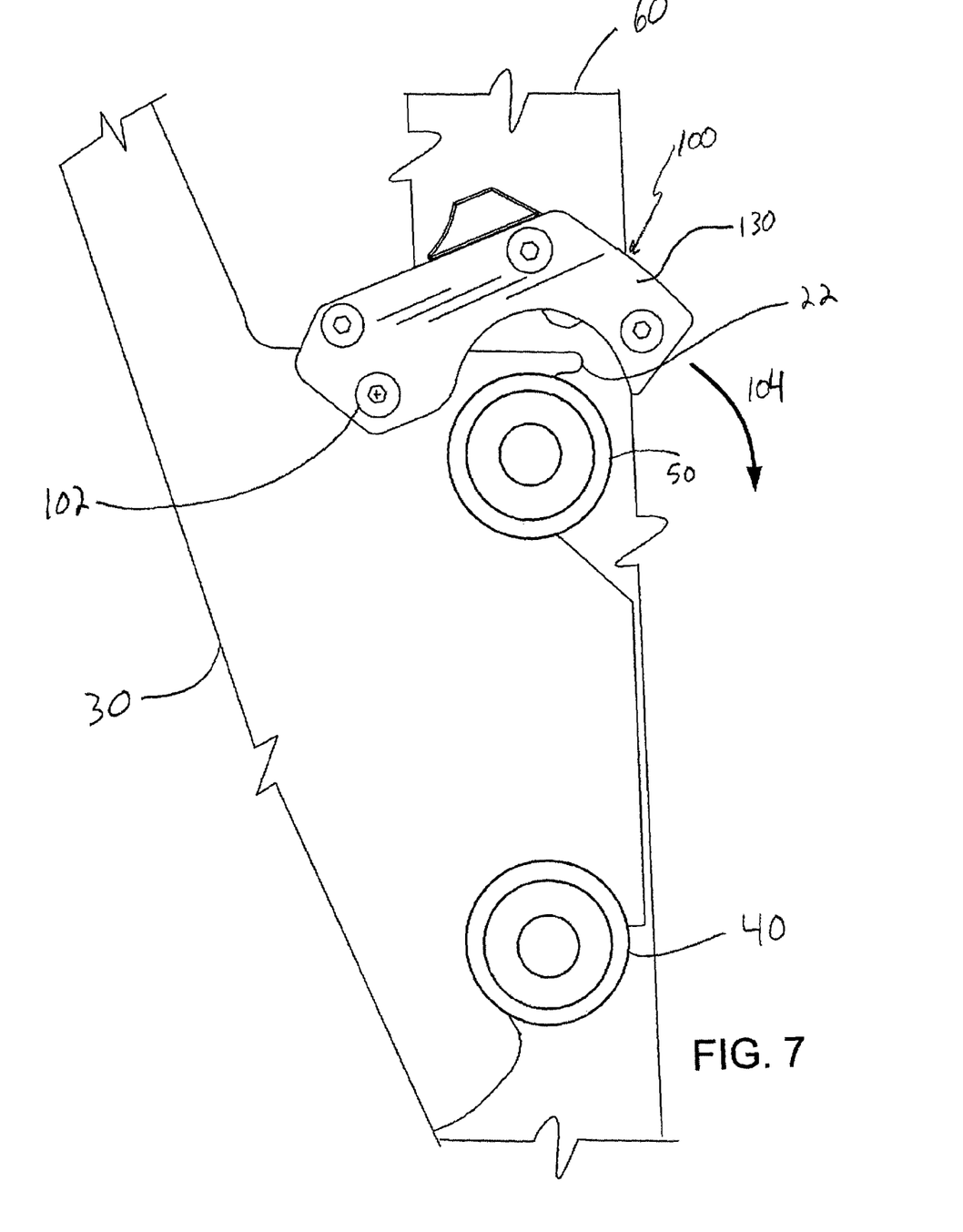
FIG. 7—Front view showing both slots of the accessory portion of the invention engaged with both docking members and the latch mechanism in its open position.
Figure 8:
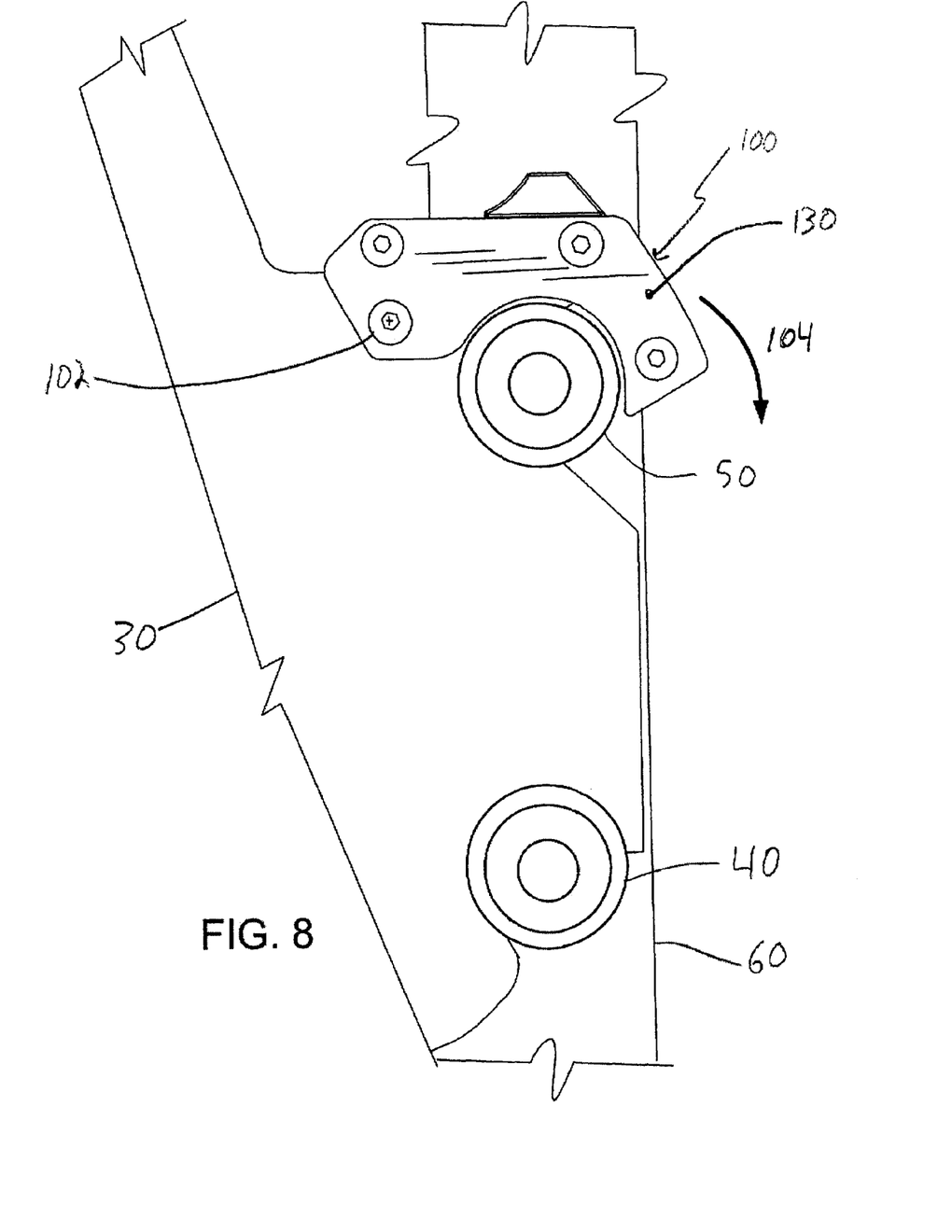
FIG. 8—Front view showing both slots of the accessory portion of the invention engaged with both docking members and the latch mechanism in its closed position.
Figure 18:
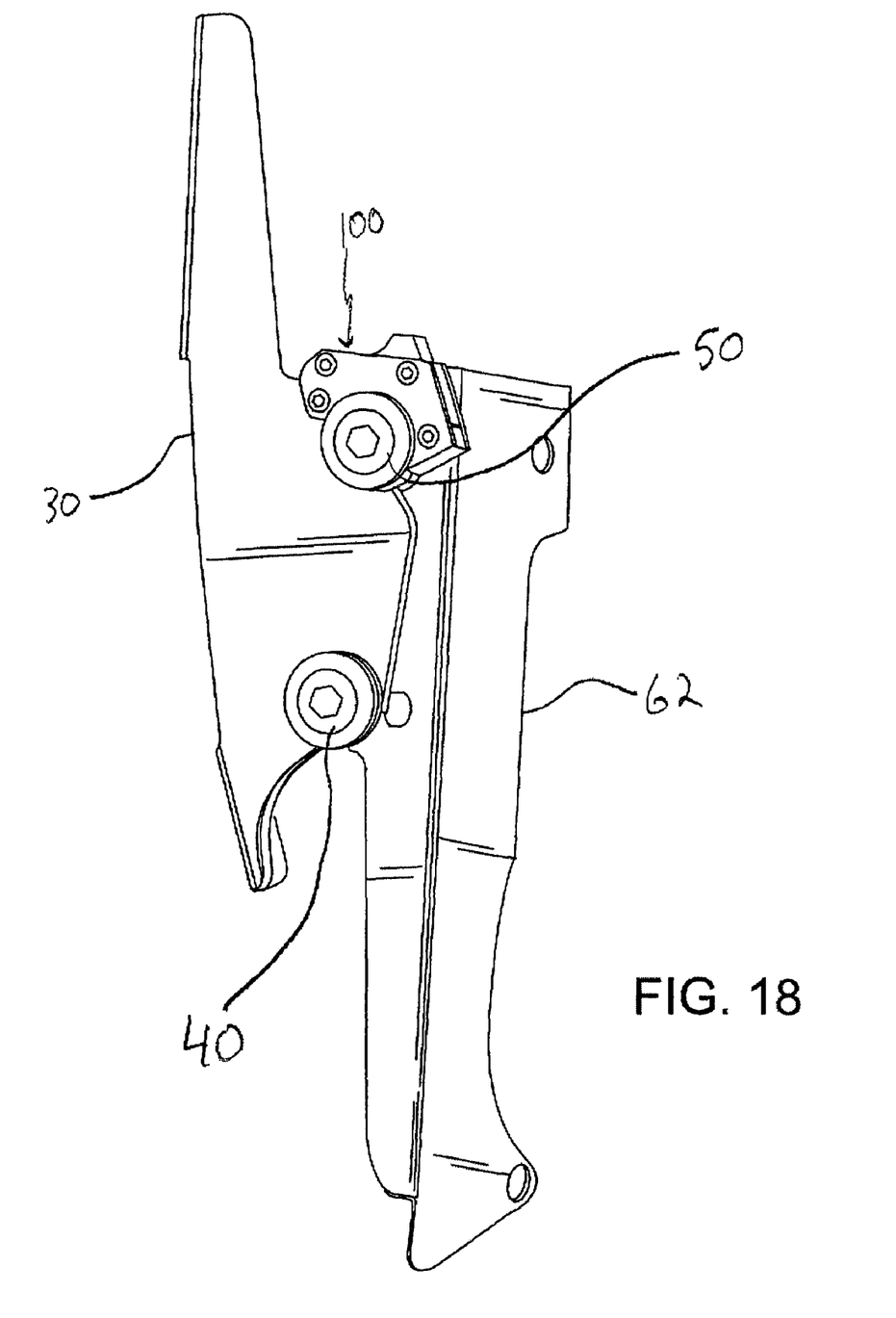
FIG. 18 perspective view of an application of the invention in which the docking members are mounted on a bracket.

Referring now to FIGS. 6-8, it can be seen that the first step in attaching an accessory, represented as mounting plate 30, to object 60, typically a motorcycle, is to slide slot 10 around docking member 40 as shown in FIG. 6. Mounting plate 30 is then rotated about docking member 40, in the direction of arrow 12 until slot 20 has slid around docking member 50, as shown in FIG. 7. Latch mechanism 100 is then rotated around connection point 102 in the direction of arrow 104 until hook portion 152 of sliding member 150 engages finger 22 of mounting plate 30 and latches mounting plate 30 into place on docking members 40 and 50. While docking members 40 and 50 are shown as being directly connected to object 60, docking members 40 and 50 could also be installed on a bracket that is then attached to the object 60. FIG. 18 illustrates an embodiment of the invention in which docking members 40 and 50 are attached to a bracket 62 that can then be mounted on a motorcycle or other object 60.

Figure 16A:
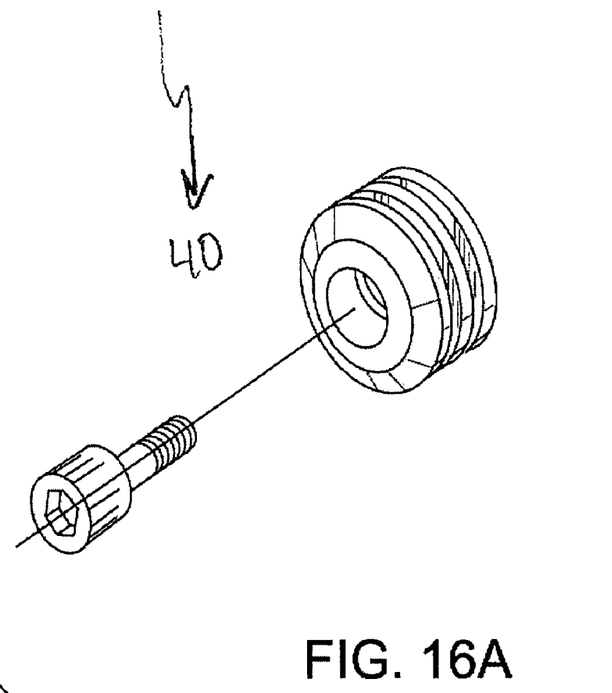
FIG. 16A—Perspective view of a docking member.
Figure 16B:
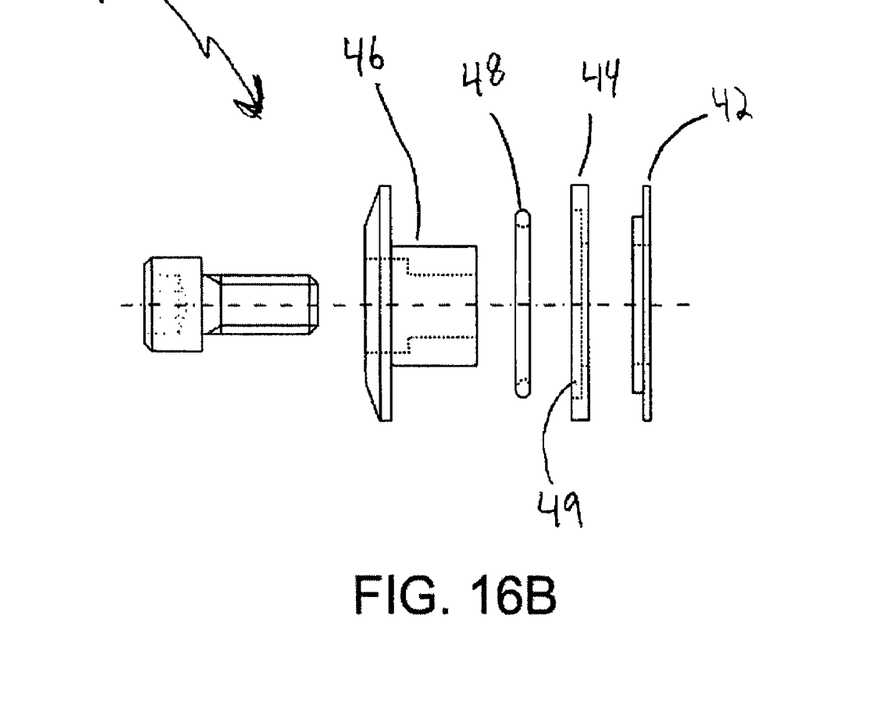
FIGS. 16B—Exploded view of one of the docking members showing the shoulder washer, the two-piece nylon bushing, and the neoprene O-ring FIG. 17—View of the invention attaching a windshield to a motorcycle.

Docking members 40 and 50 have the same basic structure, which is shown in the exploded view of docking member 40 in FIG. 16B. Docking member 40 includes a two-piece nylon bushing 42, 44 that is supported by aluminum shoulder washer 46. To allow for variation in the thickness of mounting plate 30, neoprene O-ring 48 is contained in channel 49 that is defined in nylon bushing portion 44 such that neoprene O-ring 48 presses against aluminum shoulder washer 46 to maintain pressure on mounting plate 30. In addition, slots 10 and 20 are sized to slide onto nylon bushings 42 and 44 without requiring the bushings to be compressed, resulting in a device that requires little force to install compared to prior art devices that depend on the compression of a rubber bushing in order to retain the accessory in place. Thus, the present invention can be used in applications where it is not possible to gain a sufficient mechanical advantage to compress a rubber bushing.

Figure 17:
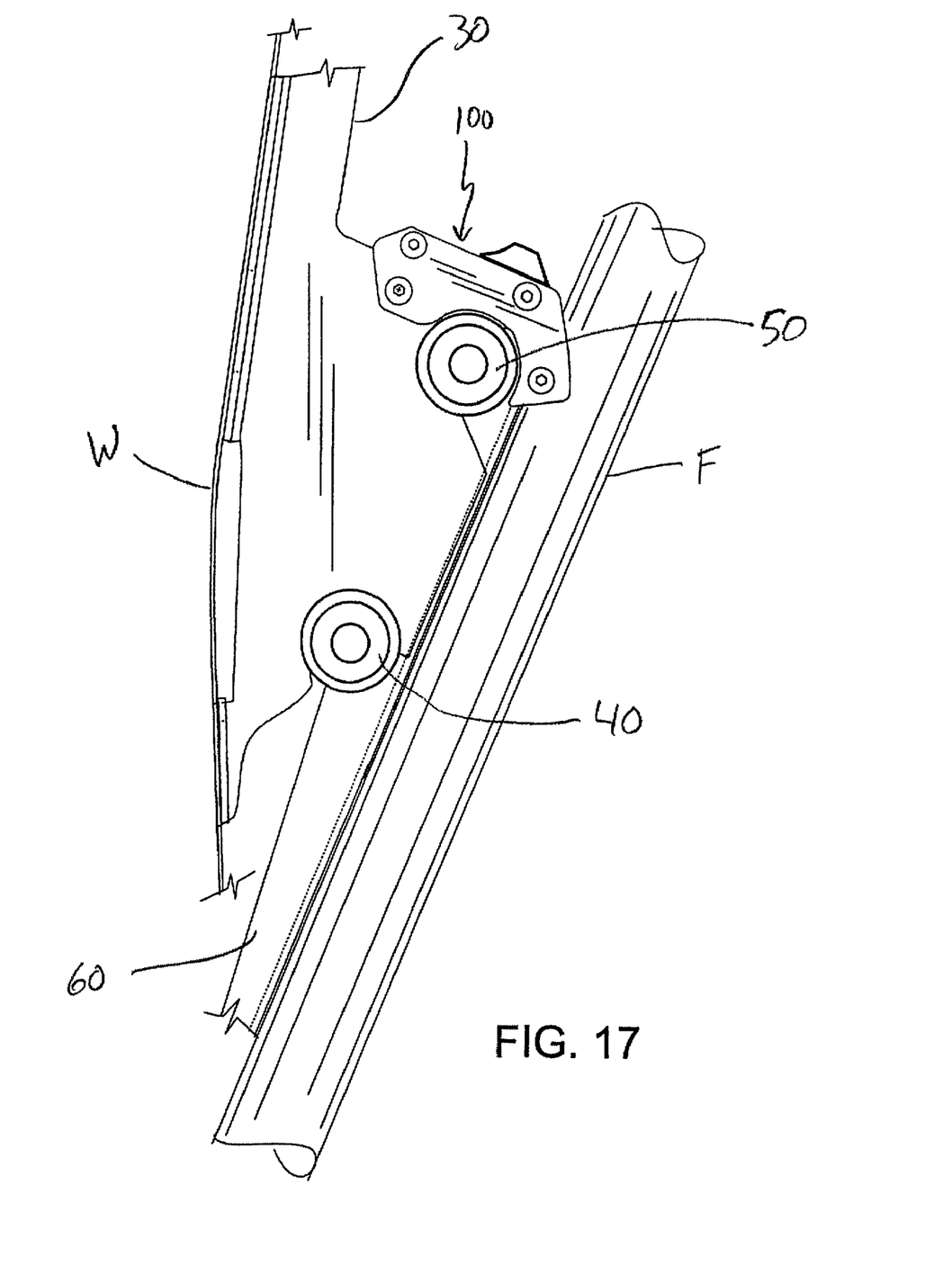

Also, in certain applications such as the installation of a motorcycle windshield, docking members 40 and 50 could each be attached to a motorcycle fork clamp such as the clamp disclosed in U.S. Pat. No. 5,988,727 by the same inventor, which is incorporated by reference herein. Using this clamp allows the user to obtain the proper spacing between docking members 40 and 50 regardless of the particular shape of the motorcycle's fork. Alternatively bracket 60 could be attached to motorcycle fork F as shown in FIG. 17. In this example, mounting plate 30 is adapted to be connected to windshield W. While only the left side is shown, it is easily understood by one of ordinary skill in the art that a mirror-image of the structure shown in FIG. 17 is used on the right side of the motorcycle to secure windshield W. It is similarly understood that this invention allows for the rake angle of a windshield to be easily varied by varying the location of upper docking member 50 relative to lower docking member 40 or by varying the location of slots 10 and 20 in mounting plate 30 relative to the angle of windshield W.

Referring now to FIGS. 9-15, the details of the internal structure of latch mechanism 100 can be observed as well as the operation of latch mechanism 100. In these figures, first housing portion 120 has been removed revealing features that are generally internal to housing 110, including sliding member 150 that is generally contained within housing 106, raised screw bosses 132, 134, and 135 that arise from the inner surface of second housing portion 130, and spring 140.

Spring 140 resides in slot 154 that is defined in sliding member 150. Spring 140 is compressed between second boss 134 and the end of slot 154 such that spring 140 normally biases sliding member 150 to a latched position as shown in FIG. 9.

Figures 9, 10, 11:
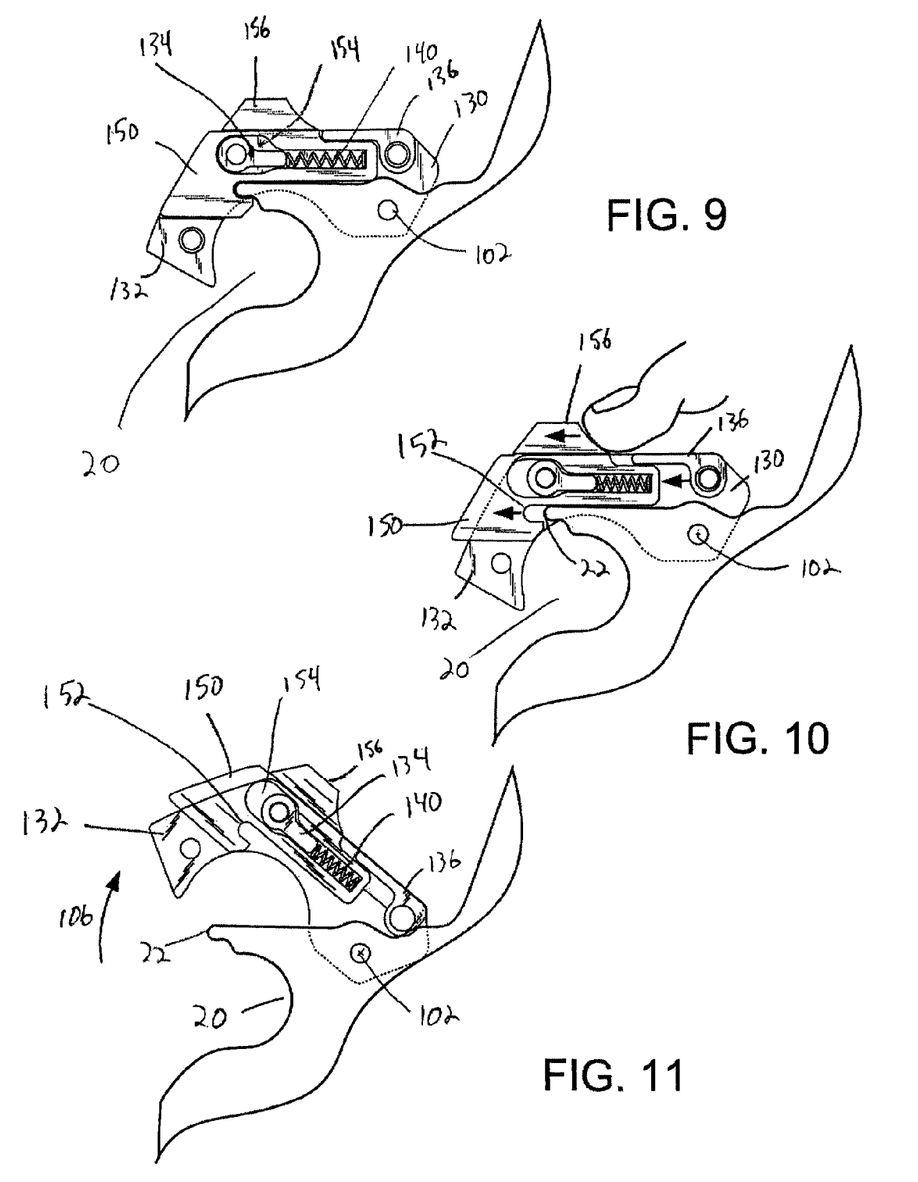
FIG. 9—Illustration of the latch mechanism in its closed, latched position.
FIG. 10—Illustration of the latch mechanism being moved to its closed, unlatched position.
FIG. 11—Illustration of the latch mechanism being rotated to its open position after being unlatched.

Referring now to FIG. 10, it can be seen that sliding member 150 is moved to an unlatched position by applying pressure to finger pad 156, which results in spring 140 being further compressed and hook portion 152 moving away from and disengaging finger 22 of slot 20. It should be noted in this figure that the geometry of boss 134 and slot 154 cooperate to allow spring 140 to be compressed enough to allow hook portion 152 of sliding member 150 to disengage finger 22 of slot 20 but prevent spring 140 from being overly compressed by providing a physical limit on the movement of sliding member 150. It should be further noted that first boss 132 and third boss 136 cooperate to prevent sliding member 150 from rotating.

Referring now to FIG. 11, once sliding member 150 has been slid into its unlocked position, latch mechanism 100 is rotated in the direction of arrow 106, which is the opposite of the direction indicated by arrow 104, to its open position. In this position, mounting plate 30 can be slid around docking member 50 using slot 20, or if mounting plate 30 had already been slid around docking member 50 using slot 20, mounting plate 30 can be slid off of docking member 50.

It should further be noted that the process of unlatching this mechanism requires the application of two different forces acting in different directions. The first of these forces is the force acting through finger pad 156 to slide sliding member 150 into its unlatched position, and the second force is the force acting in the direction of arrow 106 to rotate the latching mechanism to its open position. Thus, an accidental unlatching would be extremely unlikely since it would require the simultaneous, accidental application of forces to different portions of the latch mechanism that are acting in different directions.

Figure 12:
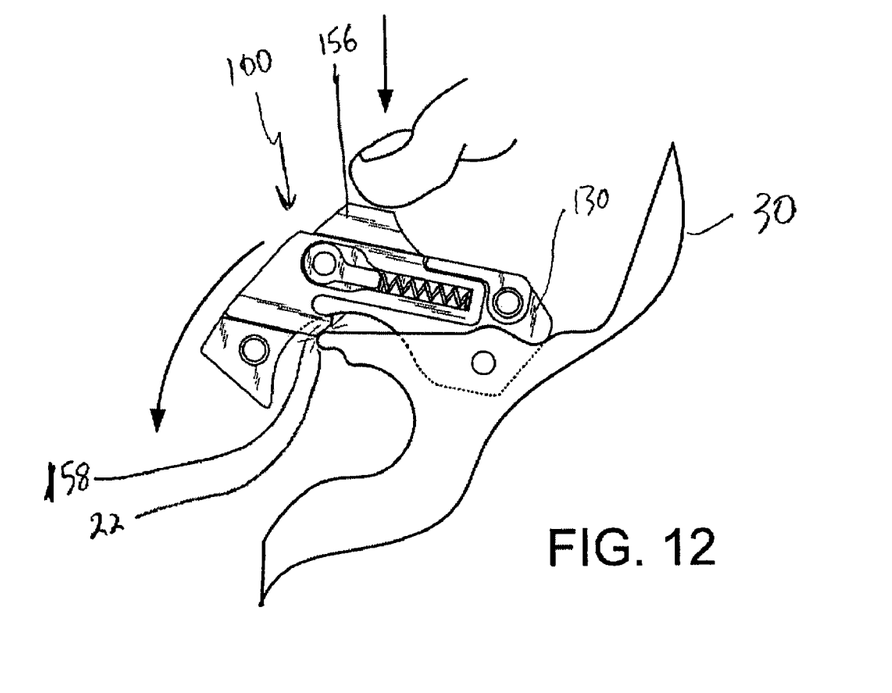
FIG. 12—Illustration of the latch mechanism being rotated toward its closed, latched position showing the interference between the sliding member of the latch mechanism and the bracket defining the slots.
Figure 13:
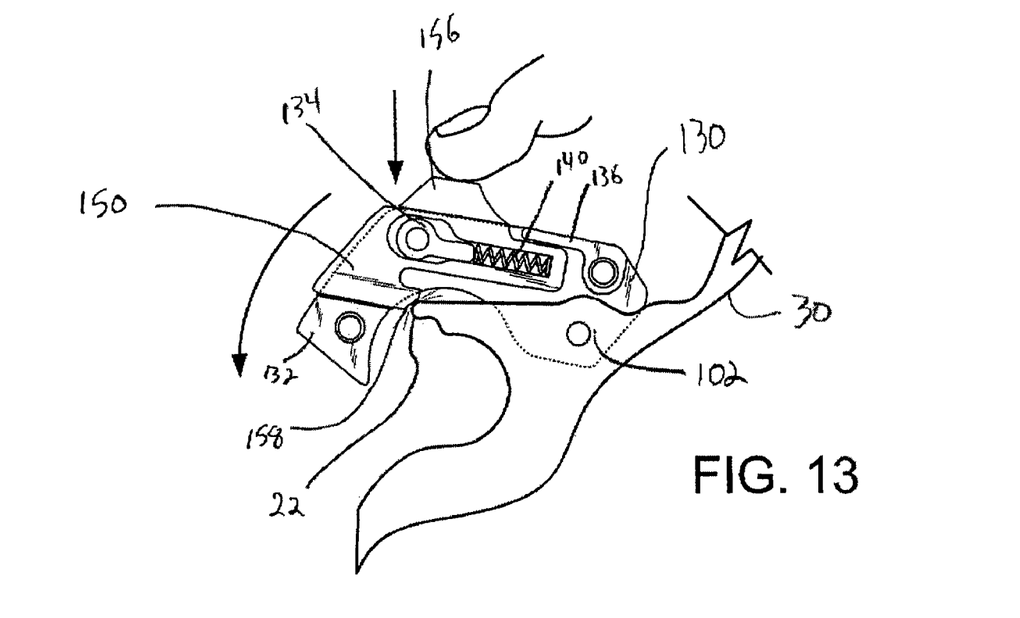
FIG. 13—Illustration of the latch mechanism being rotated toward its closed, latched position showing the sliding member of the latch mechanism moving toward an unlatched position by the bracket.
Figure 14:
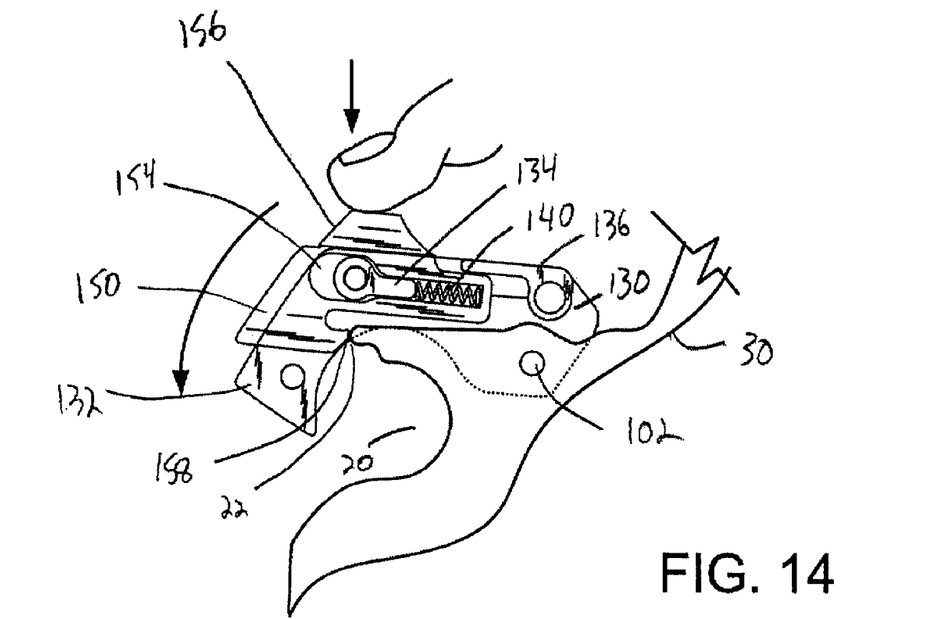
FIG. 14—Illustration of the latch mechanism being rotated toward its closed, latched position showing the sliding member of the latch mechanism moving toward an unlatched position by the bracket.
Figure 15:
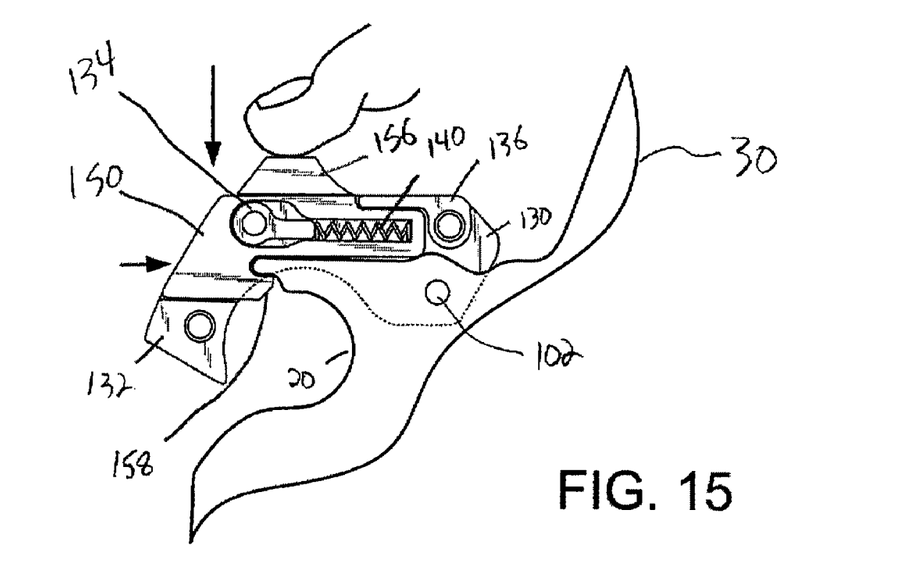
FIG. 15—Illustration of the sliding member of the latch mechanism sliding into its latched position after it clears the end of the portion of the bracket defining the slot.

Referring now to FIGS. 12-15, the latching of latch mechanism 100 can be observed. Referring specifically to FIG. 12, sliding mechanism 150 includes shoulder portion 158 that interferes with finger 22 as latch mechanism 150 is rotated to its closed position in the direction of arrow 104. The shape of shoulder portion 158 is designed to ride along the end portion of finger 22, causing sliding member 150 to slide toward its unlatched position as latch mechanism 100 is rotated into its closed position. This progression is shown in FIGS. 13 and 14. Once shoulder portion 158 is clear of finger 22, spring 140 causes sliding member 150 to slide back into its latched position with hook portion 152 engaging finger 22, as shown in FIG. 15. As such, the invention provides the user with confirmation that the accessory has been securely attached visually, through the observation of latch mechanism 100 in its closed position; tactilely, when the sliding mechanism pops into its latched position; and aurally, again when the sliding mechanism pops into its closed position.

While the above describes the illustrated embodiment, those skilled in the art may appreciate that certain modifications may be made to the apparatus and methodology herein disclosed, without departing from the scope and spirit of the invention. Thus, it should be understood that the invention may be adapted to numerous rearrangements, modifications, and alterations and that all such are intended to be within the scope of the appended claims.

I claim:

1. An apparatus for removably attaching an accessory to an object comprising:

a pair of spaced apart docking members in fixed relation to the object;
the first docking member of said pair having a mounting bushing, said mounting bushing having a mating diameter;
the second docking member of said pair having a mounting bushing, said mounting bushing having a mating diameter;
a mounting plate connected to said accessory, said mounting plate defining a first slot, the first slot having an open end portion and a semi-circular closed end portion having a diameter complimentary to the mating diameter of the mounting bushing of the first docking member, and a second slot, the second slot being defined in part by a finger portion of the mounting bracket and having an open end portion and a semi-circular closed end portion having a diameter complimentary to the mating diameter of the mounting bushing of the second docking member;
said first and second slot being defined in the mounting plate such that the closed end portion of the first slot and the closed end portion of the second slot respectively and simultaneously engage the mounting bushing of the first docking member and the mounting bushing of the second docking member;
a latch mechanism, said latch mechanism being pivotally attached to said mounting plate and said latch mechanism having an open position wherein it does not occlude the opening of the second slot and a closed position wherein the latch mechanism at least partially occludes the opening of the second slot
said latching mechanism further comprising
a sliding latching member, said latching member having a first end portion, an opposing second end portion, and a hook portion sized to receive the end portion of the finger portion of the mounting bracket, the hook portion being located toward a first end portion of the latching member and said latching member defining an elongated aperture running from the first end portion of the latching member to the second end portion of the latching member;
a first housing portion having an interior side and a boss projecting from the interior side of the first housing portion;
a second housing member having an interior side; and
a spring;
wherein the latching member is located adjacent to the interior side of the first housing portion such that the boss extends through the elongated aperture defined in the latching member; the spring is located within the elongated slot defined in the latching member and is compressed between the end of the elongated slot toward the second end portion of the latching member and the boss extending through the elongated slot; and the interior side of the second housing portion is adjacent to both the latching member and the boss extending from the interior side of the first housing portion such that the latching member can be slidably moved within the housing portions.

2. The apparatus of claim 1 wherein the first and second docking members are identical.

3. The apparatus of claim 2 wherein each docking member further comprises:
   a shoulder washer, the shoulder washer having a first end portion in contact with the object, a cylindrical center portion connected to the first end portion and extending away from the object, and a second end portion having a diameter greater than the cylindrical center portion and an inner surface adjacent to the cylindrical center portion; and
   an O-ring located adjacent to the inner surface of the second end portion of the shoulder washer;
   wherein the mounting bushing further comprises a connecting portion and a separate guide portion; the connecting portion defining an aperture therethrough for receiving the cylindrical center portion of the shoulder washer and having a mating section having the mating diameter and a retaining section having a diameter greater than the mating diameter, the retaining section of the connecting portion being adjacent to the O-ring; the guide portion defining an aperture therethrough for receiving the cylindrical center portion of the shoulder washer and having a diameter equal to the diameter of the retaining section of the connecting portion, the guide portion being located between the object and the mating section of the connecting portion.

4. The apparatus of claim 3 wherein the latch mechanism further comprises:
   a pair of parallel retaining surfaces, said parallel retaining surfaces being arc-shaped and complimentary in diameter to the diameter of the retaining section of the mounting bushing and the guide portion of the mounting bushing, said pair of parallel retaining surfaces being adjacent to the retaining section of the mounting bushing and the guide portion of the mounting bushing when the latch mechanism is in its closed position.

5. The apparatus of claim 2 wherein the pair of spaced apart docking members are connected to a bracket and the bracket is connected to the object.

6. The apparatus of claim 5 wherein each docking member further comprises:
   a shoulder washer, said shoulder washer having a cylindrical body with a first end and a second end and a head portion connected to the first end of the cylindrical body wherein the second end of the cylindrical body is adjacent to the bracket; and
   an O-ring adjacent to the head portion of the shoulder washer through which the cylindrical portion of the shoulder washer extends;
   wherein the mounting bushing is spool-shaped with a central portion of the spool shape having the mating diameter, having a length equal to the thickness of the mounting plate, and being flanked by a pair of end portions, each end portion having a diameter greater than the mating diameter, and wherein the mounting bushing defines an aperture therethrough to receive the cylindrical portion of the shoulder washer whereby a first end portion of the mounting bushing is adjacent to the O-ring and the second end portion of the mounting portion is adjacent to the bracket.

7. The apparatus of claim 1 wherein the mating diameter of the first docking member is not the same as the mating diameter of the second docking member.

8. The apparatus of claim 1 wherein the first slot defined in the mounting plate is parallel to the second slot defined in the mounting plate.

9. An apparatus for removably attaching an accessory to an object comprising:
   a pair of spaced apart docking members in fixed relation to the object;
      the first docking member of said pair having a mounting bushing, said mounting bushing having a mating diameter;
      the second docking member of said pair having a mounting bushing, said mounting bushing having a mating diameter;
   a mounting plate connected to said accessory, said mounting plate defining a first slot, the first slot having an open end portion and a semi-circular closed end portion having a diameter complimentary to the mating diameter of the mounting bushing of the first docking member, and a second slot, the second slot being defined in part by a finger portion of the mounting bracket and having an open end portion and a semi-circular closed end portion having a diameter complimentary to the mating diameter of the mounting bushing of the second docking member;
   said first and second slot being defined in the mounting plate such that the closed end portion of the first slot and the closed end portion of the second slot respectively and simultaneously engage the mounting bushing of the first docking member and the mounting bushing of the second docking member;
   a latch mechanism, said latch mechanism being pivotally attached to said mounting plate and said latch mechanism having an open position wherein it does not occlude the opening of the second slot and a closed position wherein the latch mechanism at least partially occludes the opening of the second slot
   said latch mechanism further comprising
      a latching member that can be slidably moved within the latch mechanism, said latching member having a hook-shaped portion complimentary in shape to the end portion of the finger portion of the mounting plate that can be moved from a latching position to an unlatching position whereby said hook-shaped portion of the latching member engages the finger portion of the mounting plate when the latching member is in its latching position and the latch mechanism is in its closed position.

10. The apparatus of claim 9 wherein the latch mechanism further comprises
    means for biasing the latching member to its latching position.

11. The apparatus of claim 10 wherein the latch mechanism further comprises
    an elongated slot defined in the latching member;
    an internal boss extending through said elongated slot; and
    a spring, said spring being located within said elongated slot and being compressed between 112 said boss and a portion of the latching member defining an end of the elongated slot.

12. An apparatus for removably attaching an accessory to an object comprising:
    a pair of spaced apart docking members in fixed relation to the object;

the first docking member of said pair having a mounting bushing, said mounting bushing having a mating diameter;

the second docking member of said pair having a mounting bushing, said mounting bushing having a mating diameter;

a mounting plate connected to said accessory, said mounting plate defining a first slot, the first slot having an open end portion and a semi-circular closed end portion having a diameter complimentary to the mating diameter of the mounting bushing of the first docking member, and a second slot, the second slot being defined in part by a finger portion of the mounting bracket and having an open end portion and a semi-circular closed end portion having a diameter complimentary to the mating diameter of the mounting bushing of the second docking member;

said first and second slot being defined in the mounting plate such that the closed end portion of the first slot and the closed end portion of the second slot respectively and simultaneously engage the mounting bushing of the first docking member and the mounting bushing of the second docking member;

a latch mechanism, said latch mechanism being pivotally attached to said mounting plate allowing it to rotate from a closed position wherein said latch mechanism at least partially occludes the opening to the second slot defined in the mounting plate to an open position wherein the latch mechanism does not occlude the opening to the second slot defined in the mounting plate, and said latch mechanism having a latching member that can be slidably moved from a latching position to an unlatching position, said latching member defining an elongated slot therethrough and having a hook-shaped portion complimentary in shape to the end portion of the finger portion of the mounting plate whereby said hook-shaped portion of the latching member engages the finger portion of the mounting plate when the latching member is in its latching position and the latch mechanism is in its closed position;

an internal boss extending through said elongated slot; and a spring, said spring being located within said elongated slot and being compressed between said boss and a portion of the latching member defining an end of the elongated slot.

\* \* \* \* \*